(No Model.) 4 Sheets—Sheet 1.
L. GUTMANN.
ALTERNATING CURRENT MOTOR.

No. 467,537. Patented Jan. 26, 1892.

Witnesses:
D. W. Gardner
Nellie L. Pope

Inventor:
Ludwig Gutmann
By his Attorney,
Edward P. Thompson (No Model.) 4 Sheets—Sheet 2.
L. GUTMANN.
ALTERNATING CURRENT MOTOR.
No. 467,537. Patented Jan. 26, 1892.
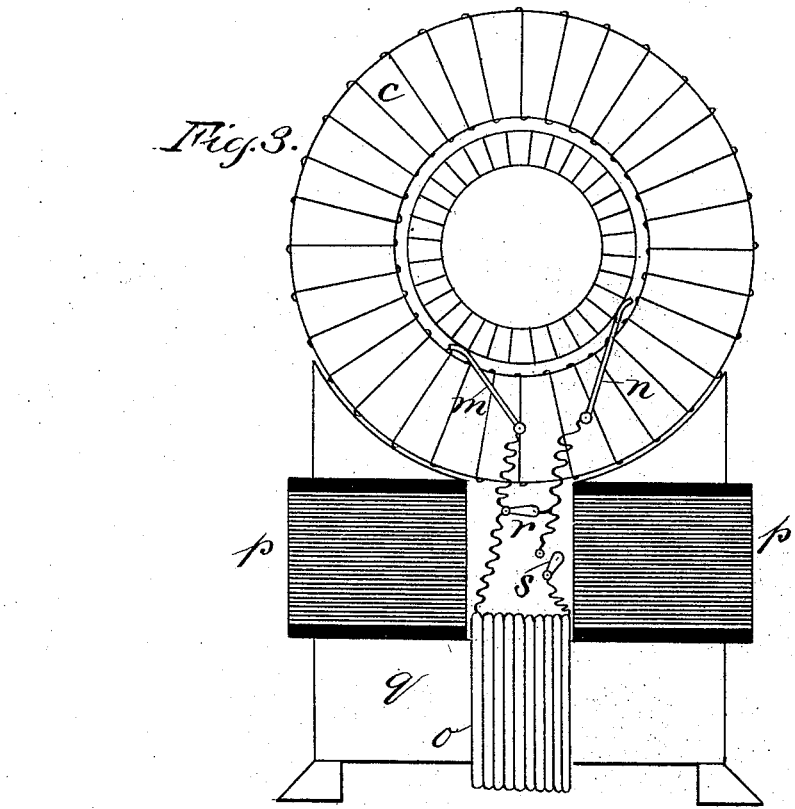
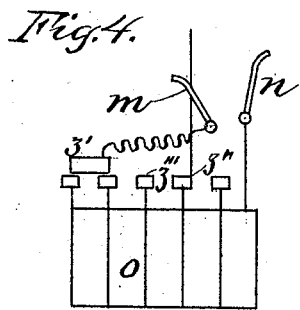
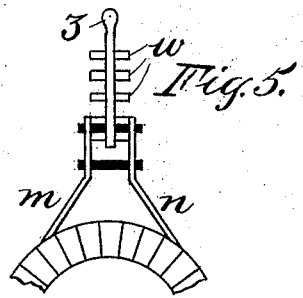
Witnesses:
D. W. Gardner
Nellie L. Pope
Inventor:
Ludwig Gutmann
By his Attorney,
Edward P. Thompson (No Model.) 4 Sheets—Sheet 3.

L. GUTMANN.
ALTERNATING CURRENT MOTOR.

No. 467,537. Patented Jan. 26, 1892.

Witnesses.
D. W. Gardner
Nellie L. Pope

Inventor:
Ludwig Gutmann
By his Attorney
Edward P. Thompson (No Model.) 4 Sheets—Sheet 4.

L. GUTMANN.
ALTERNATING CURRENT MOTOR.

No. 467,537. Patented Jan. 26, 1892.

Witnesses:
D. W. Gardner
Nellie L. Pope

Inventor:
Ludwig Gutmann
By his Attorney
Edward P. Thompson

UNITED STATES PATENT OFFICE.

LUDWIG GUTMANN, OF PITTSBURG, PENNSYLVANIA.

ALTERNATING-CURRENT MOTOR.

SPECIFICATION forming part of Letters Patent No. 467,537, dated January 26, 1892.

Application filed November 29, 1889. Serial No. 331,969. (No model.)

*To all whom it may concern:*

Be it known that I, LUDWIG GUTMANN, a subject of the Emperor of Germany, and a resident of Pittsburg, county of Allegheny, and State of Pennsylvania, have invented certain new and useful Improvements in Alternating-Electric-Current Motors, (Case 29,) of which the following is a specification.

My present invention relates to a self-regulating alternating-current motor.

The object of the invention is to distribute economically power by means of alternating electric currents.

The method comprising my invention consists in producing relative motion of the armature and field-magnets of an electric motor by giving multiple poles to the armature, by permanently forming local closed circuits in the armature by induction, and increasing the induced currents in the closed circuits by an independent and additional current.

Figure 1:
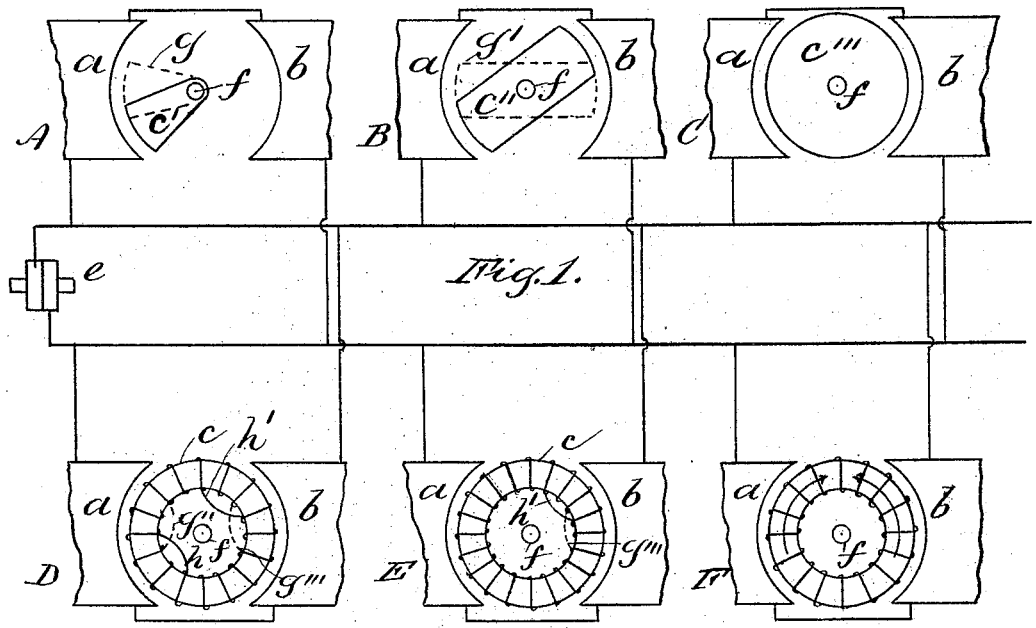
Figure 2:
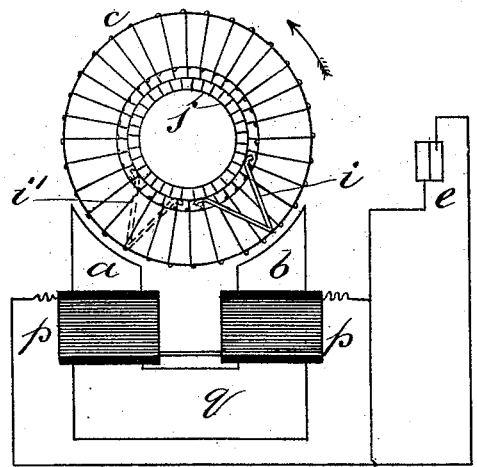
Figure 6:
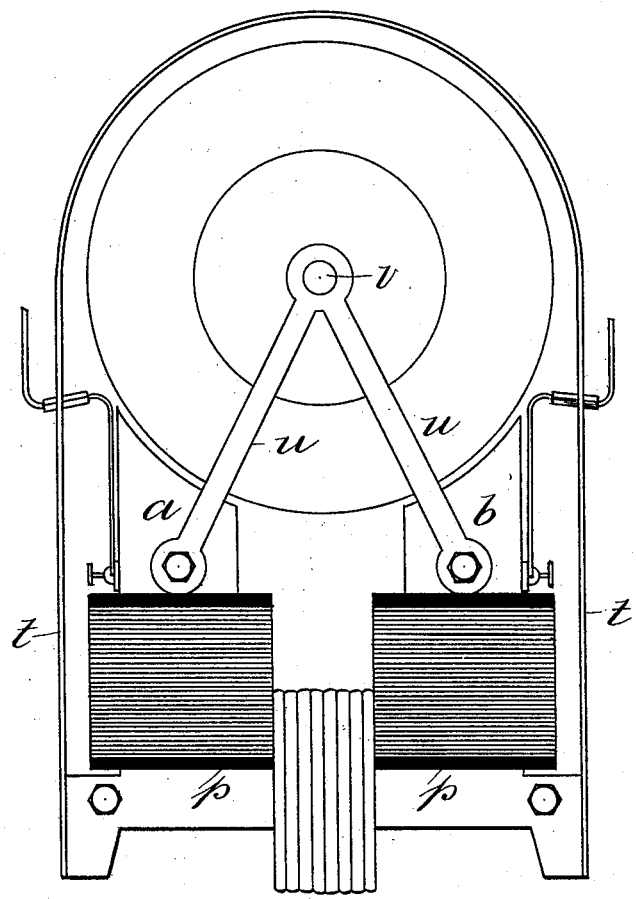
Figure 7:
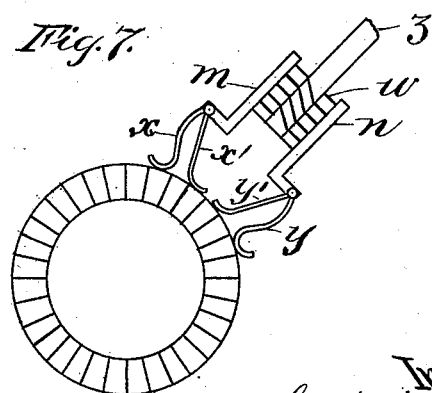
Figure 8:
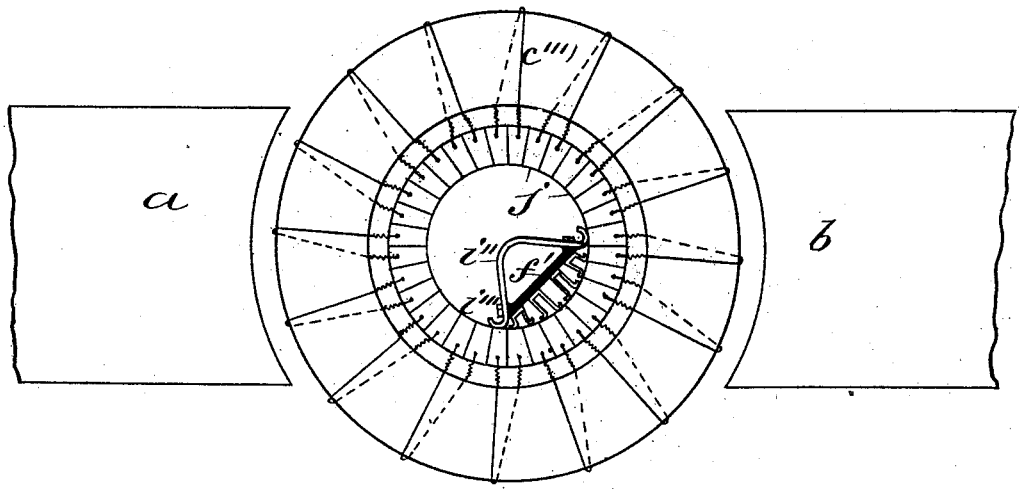
Figure 9:
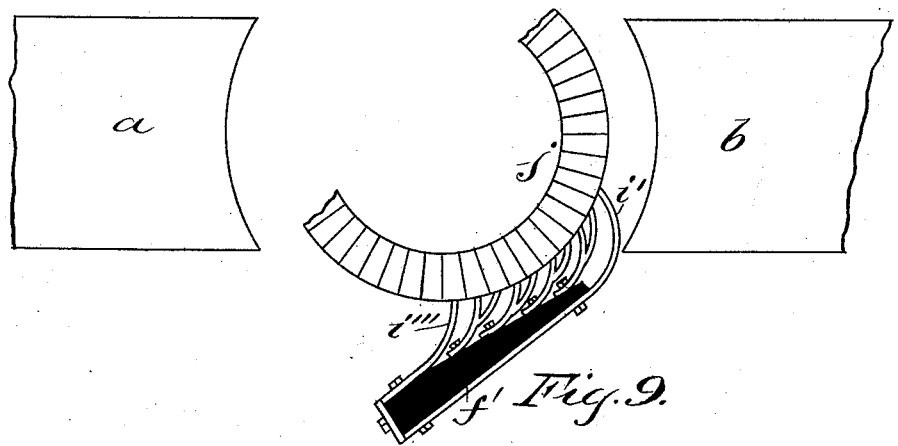

The complete invention, with its details, is explained by reference to the accompanying drawings, in which the principle of action is shown in Figure 1 by motors A, B, C, D, E, and F in circuit with the generator $e$. The figure is in diagram partly. Fig. 2 shows the simplest form of the device. Fig. 3 is a side elevation (as is also Fig. 2 a side elevation) of the same device seen in Fig. 2, with the exception of certain modifications set forth hereinafter. Fig. 4 shows a detail which may be put into combination with the device shown in Fig. 3. Fig. 5 shows a detail of a modified form of brush which is adapted to afford regulation of the motor. Only a portion (part of the commutator-plates) is shown in said figure. Fig. 6 shows a simple form of a small motor suitable for driving ventilators, sewing-machines, and similar small machines. Fig. 7 shows a modified form of brush to serve as a means of regulation. Fig. 8 shows a disposition of armature-coils and commutator-plates adapted to make use of an open-coil armature in carrying out my invention. Fig. 9 shows the same with a modified form of brush.

In all the figures, $a$ and $b$ represent the respective pole-pieces of the field of the motor, while $c$ represents the armature in Fig. 1 at motors D, E, F, Figs. 2 and 3; $c'$, also an armature of different form in Fig. 1 at motor A; $c''$, a further modification of an armature in Fig. 1 at motor B, and $c'''$ a further modification of armature in Fig. 1 at motor C, and $c''''$ a further modification of armature in Fig. 8.

$c$ represents a closed-coil armature. $c'$ may be a piece of iron or an unsymmetrical armature.

$c''$ is a modification of armature $c'$, while $c'''$ is a symmetrical armature. It may be a disk of soft iron or other suitable, but preferably magnetic, material. By symmetrical armature I mean one which in all positions exposes to the field-poles an equally good passage for the magnetic lines of force, while an unsymmetrical armature under similar conditions exposes passages or circuits of different magnetic resistance, being balanced in positions of maximum and neutral field, while in all other positions it has a tendency to assume the balanced condition.

$c''''$ shows an open-coil armature, each coil $d$ being represented, for the sake of clearness, by a single ring. The field-magnets are in circuit with the alternating-current generator $e$, and are shown thus in Figs. 1 and 2, as an illustration that the field-magnets are so in circuit.

Referring to Fig. 1, experiment shows that if the armature $c'$ is pivoted at the point $f$, on one end of said armature and between the two field-poles $a$ and $b$, the said armature $c'$ will be deflected from the natural position in which it hangs—namely, downward—toward one of the field-magnet poles, as shown by the dotted line $g$. Deflection will occur whether the current is from an alternating-current generator $e$, as shown, or from a direct-current generator, which may be substituted for the generator $e$. A deflection will also occur if the armature $c''$ is substituted for $c'$, which is pivoted at the center, so that in all positions one end of said armature is just as near one pole-piece as the other end is near the other pole-piece. The new position obtained by the deflection is represented by the dotted line $g'$. The deflection will occur with either an alternating-current or direct-current dynamo. The piece or armature, it will be noticed, is in the shape of a portion of a disk. In Fig. 1, C, the armature, is a disk $c'''$. In this case no motion of the armature will occur whatever. The poles induced in the disk $c'''$ are caused by the magnet-poles $a$ $b$, and evidently are lying in the strongest or maximum field. If the armature were no disk, but an oblong or rectangle, a displacement of the armature would cause a displacement of the induced armature-poles, which said poles would return to maximum position as soon as the armature is released; but being a disk it has its periphery in all and every position equally distant from the poles, and consequently the induced poles are constantly maintained in maximum position—i. e., facing the field-poles. The two electric fields developed lie in the same plane and act with maximum force on one another. There is consequently no tendency to rotate. I prefer to call this disposition of the armature with relation to the field developed by the magnet as being in "indifferent magnetic equilibrium." In Fig. 1, D, the armature, is a closed ring provided with a closed coil in the manner of a closed-coil armature of the ring type. If less than all the coils (or convolutions of the coils) are short-circuited by the conductor $h$ or by two conductors—namely, said $h$ and $h'$ at diametrically-opposite locations—then will the armature come to rest at the position such that the conductors $h$ and $h'$ occupy the positions represented by the dotted lines $g''$ and $g'''$, respectively—viz., in such a position in which the lines of force flow through the core of the short-circuited winding so as not to thread the coil, but to flow parallel to the convolutions, in which position the coil is without current or has minimum current-strength. In the figure less than half of the coils are short-circuited by each conductor. In Fig. 1, E, only one conductor $h$ $h'$ is shown, and in this case the armature will come to rest at the position indicated by the dotted line $g'''$. In Fig. 1, F, the coils of the armature $c$ are not short-circuited at all and the armature will remain at rest in any given position. It should be stated that the coils or convolutions of the coils short-circuited should, in order to obtain motion, be so short-circuited at positions not directly opposite either pole-piece, but as indicated in Fig. 1, D and E—i. e., in the upper or lower halves of the armature, or partly, but unequally, in the said halves. Disk $c'''$ and armature $c$ in Fig. 1, F, are in a state of indifferent magnetic equilibrium in any position in which they may be placed, while the other armatures in Fig. 1 are not in equilibrium, except at certain positions where they reach a "staple magnetic equilibrium." If the conductor $h$, or both $h$ and $h'$, be removed at the instant when the armature comes to the position of stability, (indicated by dotted lines,) it is evident that the momentum of the armature would carry the coils which were short-circuited to their original positions, and if again short-circuited for the same distance moved through we could maintain continuous rotation. This idea is carried out in the device shown in Fig. 2, where there is a conductor similar to the conductors $h$ and $h'$, except that it is in the form of a short-circuiting brush, consisting of a conducting-block whose outline is marked $i$, short-circuiting all coils which are inclosed by the curved line $i$, or of a metallic strip or wire shaped like lines $i$, so that both its ends make contact with the commutator, which strip may also be called a "double brush," or two brushes electrically connected. The pole-pieces in Fig. 1 are diametrically opposite each other, while in Fig. 2 they are both below the armature $c$ in such a manner that both poles face the same half of the armature. The brush $i$ is about opposite one pole-piece $b$, so that the motion of rotation of the armature will be in the direction of the arrow, while if the brush is changed to the position indicated by the dotted line $i'$ the motion will be in the opposite direction.

It is well known that to obtain powerful motors not only the field, but also the armature, should be an electro-magnet, instead of permanent or temporary magnets, as shown in Fig. 1, D and E, and Fig. 2. These coils around the armature form a continuous closed winding, and each coil has a connection to the commutator-plates $j$. Therefore as the brush $i$ is in contact with any two not contiguous plates some of the coils are short-circuited, while the other coils are in a shunt to it. One-half of the armature in the form shown in Fig. 2 being almost out of action at any given instant, the same may have a chance to cool off should it become hot by the reversal of the current in the short-circuited coils. An important point to notice is that the coils short-circuited have always the same (approximately) relative position to the field-poles, so that if the brush $i$ is put in the most effective position then the coils so short-circuited will be in the maximum field for an instant, and then a few of the coils will be cut out at the next instant, while the same number will be cut in by the same brush, so that permanently some of the coils during rotation are short-circuited. The best position for the said brush can be best determined by experiment; but the drawings show, as hereinbefore stated, the approximate relative position in regard to the field pole-pieces.

The generator to be employed in connection with the device shown in Figs. 1, D, E, and F, and Fig. 2, should be by preference of the alternating or intermittent current type. It is evident that if the number of coils which are short-circuited do not alter their position with relation to the exciting field-magnet poles also the opposing armature-poles which the coils induce in or round the armature-core will maintain their position with relation to the field-magnet poles.

In Fig. 3 the short-circuiting brush is replaced by a double brush or two brushes $m$ and $n$, put in circuit with the secondary coil $o$, mounted upon the same core with the field-magnet coils $p$. This core is lettered $q$. In order to make the operation similar to that set forth in the preceding figures, a circuit-closer $r$ may be employed to short-circuit the coils by joining the terminals of the two brushes $m$ and $n$, and a second circuit-closer in circuit with the brush and coil $o$ may be employed to cut out said secondary coil $o$. The two-way switches may be advantageously replaced by a two-way switch. When the motor has attained a maximum speed or before it has been started, the coil $o$ may be put in circuit with the short-circuited coils by closing the closer $s$ and opening the closer $r$. In practice the coil $o$ would be placed upon the same part of the core as the field-magnet coils $p$. Without the coil $o$ rotation takes place by repulsion between the primary current and the secondary current induced at the same instant in the short-circuited coils. In order that the repulsion may be effectually increased by the putting in circuit the coil $o$, it is evident that the direction of winding of the said coil $o$ should be such, or the manner of connecting up said coil with the armature short-circuited coils should be such, that at any given instant the current from coil $o$ should pass in the same direction through the short-circuited coils as that of the current induced in the latter coils by or on account of their proximity to the field-magnet poles at the same instant. The exciting-current can be either of low tension or medium or high tension, depending on the length of wire of the field-magnet coils, the cross-section and connection, and while the transmission of large power will necessitate the use of medium or high tension currents in the field-magnets, which may be of comparatively high resistance, the armature may always be so constructed and connected, as well as any secondary coil or coils mounted on the field-magnet, that their ohmic resistance will be low, and the heavy currents circulating through these latter parts will develop but a low tension.

The armature (shown typically and representing either one of the open or closed coil type) and field-magnets may be partly surrounded by a cover or shell $t$ of a non-conducting or non-magnetic conductor of a solid or laminated structure placed with its flat surface toward the field and armature, Fig. 6, and the latter may be supported by an elbow $u$, whose ends are attached to the pole-pieces. The armature-shaft $v$ passes through the said elbow.

In Fig. 7 the brushes $m$ and $n$ are connected by resistances $w$, carried by a handle $z$, and their terminals are divided each into two other brushes $x\,x'$ and $y\,y'$, respectively. The brushes $x$ and $x'$ short-circuit permanently some coils of the armature and so do the brushes $y$ and $y'$. By moving the handle so that some of the resistances are cut out of circuit with the brushes $m$ and $n$ the resistance of the said brush is increased, while it is diminished when the resistances are all in the said circuit. In this manner the strength of current in the armature-coils while short-circuited is diminished or increased according to the number of resistances $w$ in circuit with said coils.

In Fig. 4 the brushes $m$ and $n$ are shown separated from the motor and connected in circuit with the coil $o$, so that the number of convolutions of said coil may be varied by moving the handle $z'$, which is also a contact-plate connected electrically with the brush $m$, while the other brush $n$ is connected to one terminal of the said coil. The contact-blocks $z''$ are connected with the various convolutions of the coil $o$. When the contact $z'$ moves over the contact-blocks $z''$ to the right, more and more convolutions are cut out of circuit with the short-circuited coils. Therefore by this method of varying the number of convolutions of the coil $o$ in circuit with the short-circuited armature-coils, which enables an additional current to be sent and its electro-motive force to assist the maximum current of these armature-coils, we obtain a means of regulating the speed of the motor.

In Fig. 8 the armature (represented by the commutator-plates $j$) is an open-coil armature, and the coils are adapted, several at a time and permanently some or all, to be closed by the brush $i''$, having multiple terminals $i'''$ on the various commutator-plates $j$. Within inductive relation to the field-magnet poles are permanently certain poles of the armature-coils thus closed, so that said coils being once located in the maximum field are acted upon by a maximum force and the power of the motor is considerably greater if the coil were permanently closed.

In Fig. 9 the brush is modified. It consists of the same terminals $i'''$, mounted upon the insulating-block $f'$, also the same as in Fig. 8; but the brush is resting on the outer periphery, while in Fig. 8 the brush connection is made with the inner periphery of the commutator. Both brushes shown in Figs. 8 and 9 are applicable to closed as well as open coil armatures.

I claim as my invention—

1. An electric motor consisting of the combination of field-magnets in circuit with an alternating-current generator, an armature whose winding is divided into circuits unequal in virtual resistance, and a secondary-current generator connected to said armature.

2. An electric motor consisting of the combination of field-magnet cores, one set of coils thereon in circuit with an alternating-current generator, a second set of coils mounted upon said core and within inductive relation to the said first set, a third set of coils mounted upon an independent core and within inductive relation to the said first set, and electric conductors dividing the coils of the third set into two or more circuits of unequal virtual resistance and electrically connecting said two or more circuits with the second set of coils.

3. An electric motor consisting of the combination of an armature provided with coils, field electro-magnets energized independently from said armature, and a short-circuiting brush closing a number of consecutive armature-coils upon themselves.

4. An electric motor consisting of the combination of field-magnets, an armature in inductive relation thereto, a closed coil wound on the armature-core and having intermediate points of its length connected to contact terminals, and two brushes electrically joined with one another by a secondary generator connecting coils lying in a strong magnetic field with others in a weak field.

5. An electric motor consisting of the combination of field-magnets in circuit with an alternating-current generator, a secondary-current generator in circuit with the said motor's armature, whose coils form two or more circuits unequal in virtual resistance, and means for varying the currents from the said second generator.

6. An electric motor consisting of the combination of an armature adapted to rotate, field-magnets in inductive relation to said armature, and a non-magnetic shield partly surrounding the armature and the field-magnet.

7. An electric motor consisting of the combination of field-magnets in circuit with one alternating-current generator and an armature-coil divided in two or more unequal circuits in series with a secondary electric generator.

8. An electric motor consisting of the combination of field-magnets, an armature provided with coils whose ends are connected to contact terminals, and two stationary brushes electrically connected with one another, the one brush being in electric connection with the armature in neutral region and the other at a part embraced by a field-magnet pole.

9. An electric motor consisting of the combination of field-magnets in circuit with an alternating-current generator, of currents of a given electro-motive force, an armature provided with a winding, and a secondary-current generator of lower electro-motive force connected electrically to the said winding of the said armature at a distance smaller than one hundred and eighty degrees, thereby dividing it into two unequal parts.

10. An electric motor consisting of the combination of field-magnet cores, one set of coils mounted thereon and in circuit with an alternating-current generator, a second set of coils mounted upon said core and within inductive relation to the said first set, and a third set of coils mounted upon an independent core and within inductive relation to the said first set, and electric conductors connecting the terminals of the second set with terminals of such coils of the said third set whose ends are not diametrically opposite each other, the coils of the third set being movable and means being provided for successively opening and closing the electric connection or conductors between successive coils of the said third set and the said second set.

11. An electric motor consisting of the combination of field-magnets in circuit with an alternating-current generator, an armature provided with a winding, an independent alternating-current generator connected to such two points of the said winding of the armature as will divide it into unequal parts, and means for varying the current from the said second generator.

In testimony that I claim the foregoing as my invention I have signed my name, in presence of two witnesses, this 22d day of November, 1889.

LUDWIG GUTMANN.

Witnesses:
J. W. SMITH,
JAMES MARK BARR.